United States Patent [19]
Strickland et al.

[11] Patent Number: 5,790,407
[45] Date of Patent: Aug. 4, 1998

[54] TIME-BASED CONTROL SYSTEM

[75] Inventors: Michael T. Strickland; Karl H. Dittrich; Kenyon L. Patterson, all of Knoxville, Tenn.

[73] Assignee: Bandit Lites, Knoxville, Tenn.

[21] Appl. No.: 615,499

[22] Filed: Mar. 12, 1996

Related U.S. Application Data

[63] Continuation-in-part of Ser. No. 272,694, Jul. 8, 1994, abandoned.

[51] Int. Cl.⁶ .................... G05B 19/06; G05D 3/00
[52] U.S. Cl. .................. 364/474.11; 364/474.12; 364/167.01; 364/174; 364/175; 364/505; 364/559; 364/550; 364/569; 254/278; 254/362; 254/276; 254/280; 254/398; 254/399; 254/264; 212/284; 212/76; 212/86; 212/329; 318/466; 318/3; 318/6; 318/638; 318/652; 318/671
[58] Field of Search .............. 364/474.11, 474.12, 364/481, 483, 550, 551.01, 551.02, 565–566, 569, 571.08, 167.01, 174, 175, 505, 559; 318/625, 637–638, 650, 671, 66, 456, 461, 466, 651, 652, 3–9, 575; 254/278, 265, 276, 280–284, 337, 362, 398, 399; 212/76, 83, 86, 97, 118, 119, 284, 321, 322, 329

[56] References Cited

U.S. PATENT DOCUMENTS

| | | | |
|---|---|---|---|
| 4,162,438 | 7/1979 | Osder | 318/564 |
| 4,553,834 | 11/1985 | Ayata et al. | 355/53 |
| 4,864,206 | 9/1989 | Onaga et al. | 318/568.11 |
| 4,905,848 | 3/1990 | Skjonberg | 212/147 |
| 4,956,910 | 9/1990 | Banner et al. | 29/593 |
| 4,959,797 | 9/1990 | McIntosh | 364/508 |
| 4,975,865 | 12/1990 | Carrette et al. | 364/573 |
| 5,003,948 | 4/1991 | Churchill et al. | 123/352 |
| 5,065,081 | 11/1991 | Shah | 318/638 |
| 5,121,039 | 6/1992 | Ishino et al. | 318/561 |
| 5,220,259 | 6/1993 | Weaver et al. | 318/432 |
| 5,309,075 | 5/1994 | Yokoe et al. | 318/608 |
| 5,313,148 | 5/1994 | Sears et al. | 318/689 |
| 5,331,267 | 7/1994 | Anderson | 318/799 |
| 5,350,988 | 9/1994 | Le | 318/618 |
| 5,408,407 | 4/1995 | Lefkowitz et al. | 364/167.01 |
| 5,440,476 | 8/1995 | Lefkowitz et al. | 364/167.01 |
| 5,444,613 | 8/1995 | Tani et al. | 364/167.01 |
| 5,521,824 | 5/1996 | Eagan et al. | 364/431.03 |

*Primary Examiner*—James P. Trammell
*Assistant Examiner*—Tuan Q. Dam
*Attorney, Agent, or Firm*—Pitts & Brittian, P.C.

[57] ABSTRACT

A time-based control system (10) for controlling a process incorporating external devices using a predefined response profile (13). The response profile (13) is continuously compared to the actual response of the controlled device (11). A plurality of sensor modules (24) is used to monitor the actual magnitude and direction of change of selected quantities during the process. If the response it outside the user-defined maximum allowable error, appropriate measures are taken to either correct the error, halt the process, or proceed with the process in a time-based mode. The proper response and detection of errors of the controlled device (11) is independent of load, rate, temperature and other external stimuli. The time-based control system (10) can detect errors caused by higher level equipment such as the sensor modules (24). Thus, the time-based control system (10) can detect when any portion of the time-based control system (10) or the controlled device (11) malfunctions. By controlling the controlled device (11) using the time-based control system (10) of the present invention, the present invention is not subject to oscillations, overshoot, or undershoot during the selected process. Therefore, the present invention protects from overload, stuck devices, overheating, and the like without the use of additional sensors.

12 Claims, 7 Drawing Sheets

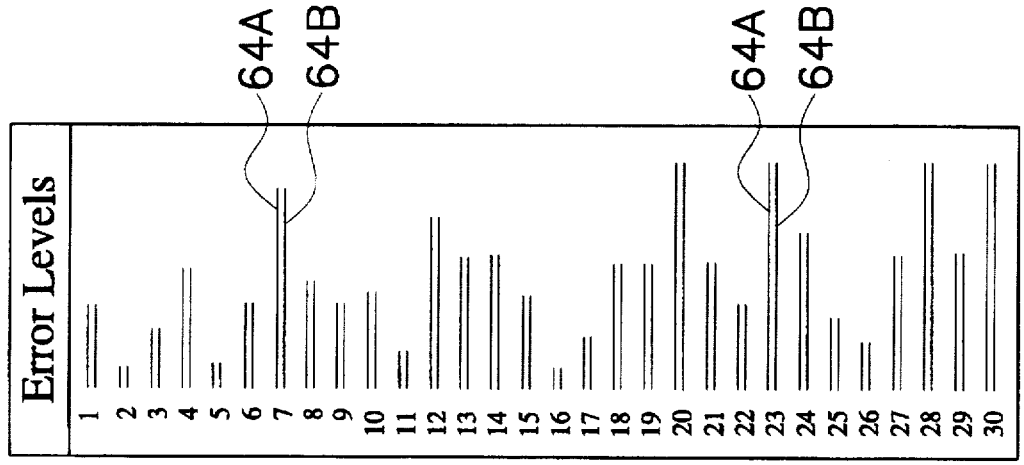
Fig.10
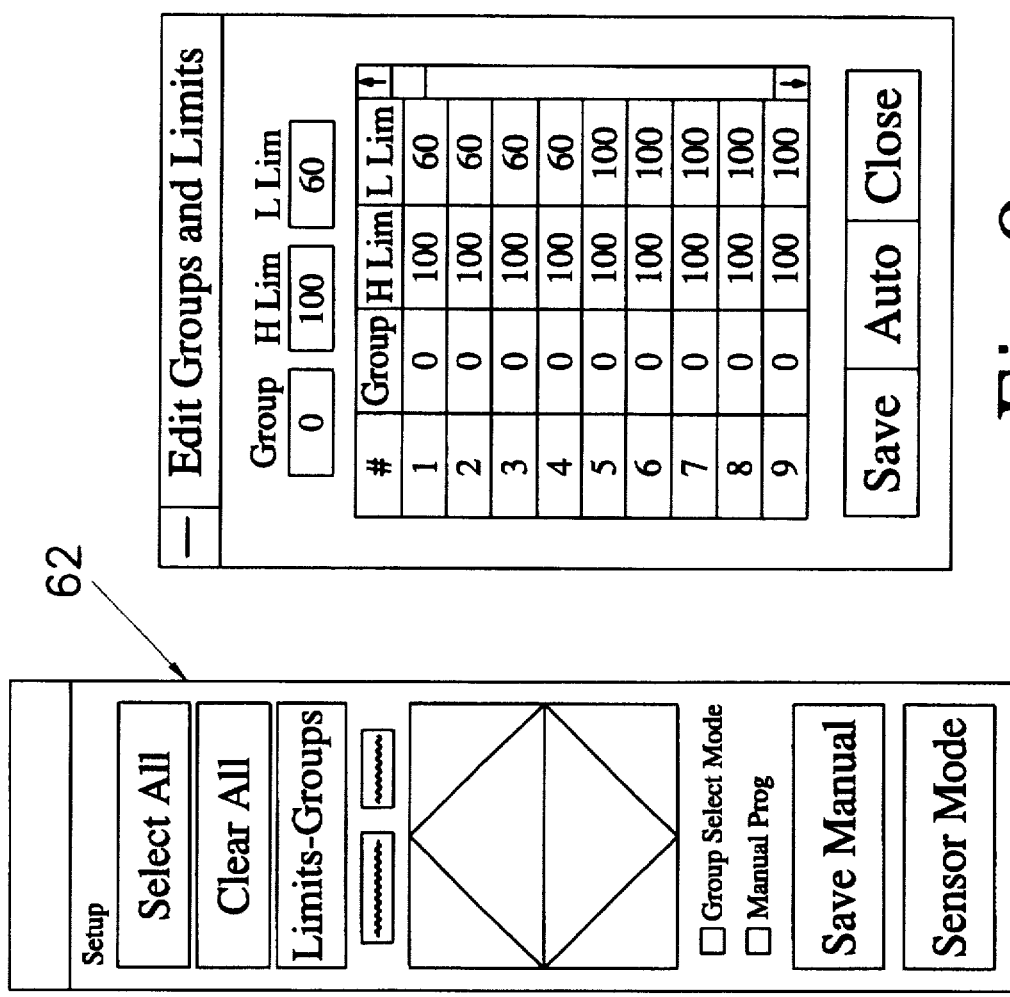
Fig.9
Fig.8

TIME-BASED CONTROL SYSTEM

This application is a continuation-in-part of my earlier filed application, Ser. No. 08/272,694, filed on Jul. 8, 1994, now abandoned.

TECHNICAL FIELD

This invention relates to the precision control of motion and process control systems such as those used for displacing objects at predetermined distances or through predetermined angles, and maintaining specific temperatures and/or pressures within discrete systems.

BACKGROUND ART

Typical environments in which control systems are used include, but are not limited to: manufacturing equipment; robotics; warehousing; inventory management; process control; aircraft control (i.e., control of rudders, ailerons, stabilizers, and the like); building, factory and home automation; and motion control. It is well known that control systems are used, for example, to raise and lower suspended objects using a take-up reel around which is wound a cable secured at a distal end to the object. It is also well known that errors in the control system whether—the error occurs in a controller, a sensor, or a device controlled by the system—can cause the entire system to fail. One such system might be used in conjunction with the operation of a light show used during a concert or other theatrical performance. In the latter instance, the lights are secured to a plurality of trusses, each of which is suspended from an overhead structure. In this instance, the trusses are suspended at either end using a cable, each cable being retractable using a motor such as that briefly mentioned above. Other configurations are used as well to impart horizontal movement to platforms or other objects associated with such a lighting system.

Another system may be used in conjunction with a climate control system. In a conventional climate control system, a thermostat is used to determine the temperature of the surrounding environment, or room temperature, for example. When the room temperature is not within a prescribed range, the sending unit is actuated in an attempt to raise or lower the room temperature to a temperature within the desired range. However, the conventional thermostat is not capable of detecting a failure in, for example, the cooling unit. Thus, when the room is warmer than the prescribed range and the thermostat signals the sending unit to deliver cooled air to the room, warm air will be delivered to the room and the unit will remain ON until it is manually shut down. Effectively, the temperature of the room will actually rise.

Conventional control systems are also used to control volumes and weights of materials. Likewise, similar malfunctions cannot be easily detected by conventional control systems.

It is well known, however, that controlled systems used in these situations are subject to malfunctioning. Common problems which may occur include the movement of the process in the wrong direction, a runaway process, or a process failure. It is well known that precision process control is a difficult control system problem, especially when used in areas such as mission-critical automated control. Safety is at a premium and system failures can result in tragedy. However, in conventional systems, problems such as those mentioned cannot be detected as no means are provided for detected controller or sensor failure. Thus, using the above example wherein a control system is used for controlling the trusses in a lighting system, when a motor experiences a runaway (wherein the motor is moving in the wrong direction), the conventional control system will continue to detect that the motor has not moved the object the specified distance and will continue to move. This may mean that a truss is raised to its farthest extent and then forced at its upper limit until it breaks. On the other hand, the truss may be lowered onto another object or onto a person. In the event the truss is moving at a rapid speed, it is obvious that this can cause physical damage to whatever is in its path.

Many problems with current systems stem from the complex forces which result from trying to control processes in one or more dimensions. In one example wherein these forces are resolved, systems have been designed that sacrifice accuracy by simply defining a deadband. For example, in conventional mechanical systems such as in the above example, the motor is turned off and left to drift unattended. Thus, accuracy is limited to the width of the deadband. Moreover, if certain values in such a system are corrupted, unexpected and severe consequences will occur as increasing error cannot be detected.

Such systems typically function in high noise, hostile environments. Reliability of each sensored device is critical as failure modes have been documented in which minor errors can cause problems so severe that processes run unexpectedly out of control. Hence, there is a need for safe and reliable mission-critical process control that can be automated and which is capable of detecting any system error and moreover abnormal behavior.

Other devices have been produced to control, or sense the control of, a process in such a mission-critical system. Typical of the art is that disclosed in the following U.S. Patents:

| U.S. Pat. No. | Inventor(s) | Issue Date |
| --- | --- | --- |
| 4,162,438 | S. S. Osder | July 24, 1979 |
| 4,553,834 | N. Ayata, et al. | Nov. 19, 1985 |
| 4,864,206 | E. M. Onaga, et al. | Sept. 5, 1989 |
| 4,905,848 | K. B. Skjonberg | Mar. 6, 1990 |
| 4,956,910 | A. C. Banner, et al. | Sept. 18, 1990 |
| 5,003,948 | J. D. Churchill, et al. | Apr. 2, 1991 |
| 5,121,039 | K. Ishino, et al. | June 9, 1992 |
| 5,350,988 | D. T. Le | Sept. 27, 1994 |
| 5,444,613 | M. Tani, et al. | Aug. 22, 1995 |

Of these devices, Skjonberg ('848) discloses a control arrangement for a multiple hoist system wherein each pulley is monitored to determine the total number of rotations made. After a predetermined number of rotations has been accomplished, the deadband is presumed to have been reached and the particular motor is stopped. However, Skjonberg does not disclose a means for determining whether the motor is moving in the proper direction or at the proper speed. Further, Skjonberg does not disclose a means for detecting a malfunction of the detectors or counters used to determine the total rotation of the individual pulleys. Therefore, it is foreseeable that a motor moving unexpectedly, in the wrong direction, or not at all may go undetected.

Le ('988) discloses a digital motor controller having a digital signal processor for generate the control commands for driving and braking a motor. As in the Skjonberg device, Le does not teach a means for detecting a malfunction of the controller and its peripherals. Onaga, et al. ('206) teach a digital robot control for control the position and velocity of the various movements of a robot. Means are provided for shutting down the operation of the robot if unexpected results are detected from the robot, such as motor temperature and motor energy. However, again, there is no provision for detecting a malfunction of the robot control itself.

None of the cited prior art is capable of detecting unanticipated movement. Thus, none of the prior art has the capability of controlling processes in a timed backup mode, wherein the system detects a sensor failure and continues to control the process based upon a particular velocity profile. For example, if a sensor fails, the conventional systems disclosed in the prior art cannot override the sensor inputs and control the process based upon the expected profiles of the process. Further, the prior art of record cannot detect a runaway condition and thus cannot remedy such conditions.

Therefore, it is an object of this invention to provide a means for controlling the operation of at least one process within a controlled system.

Another object of the present invention is to provide a means whereby the direction and speed of each of process is individually monitored.

Still another object of the present invention is to provide a means for detecting the malfunction of any of the processes.

Yet another object of the present invention is to provide a means for detecting a malfunction in the sensors used to monitor the operation of the processes.

A further object of the present invention is to detect unexpected changes in the actual process through continuous monitoring, including during periods of expected non-activity.

DISCLOSURE OF THE INVENTION

Other objects and advantages will be accomplished by the present invention which serves to monitor and control at least one process within a controlled system. The time-based control system of the present invention includes a plurality of sensors for monitoring each process, with at least one sensor being used to monitor each process. The sensors are conventional in nature and are configured for the particular process to detect the magnitude and direction of change, i.e., the magnitude of increase or decrease in weight, volume, temperature, position with respect to a reference point, etc., and whether such change is positive or negative. The sensors monitor each process during anticipated changes as well as during anticipated rest.

Each sensor signal is routed through an amplifier to a signal conditioning module. The signal conditioning module conditions the signal from the sensor module to eliminate bouncing, latching and transmission line reflections. The signal conditioning module also limits the signal from the sensor module in order to maintain the signal within a specified tolerance.

A noise immune state machine module is provided for receiving data filtered through the signal conditioning module to detect any illegal state transitions, which may indicate a sensor failure. Further, the state machine module detects the direction of travel of each of the motors. The noise immune state machine is provided also for removing spiked signals having an opposite or equal magnitude.

A time-based control module is provided for calculating time and sensor errors, and further for analyzing the actual performance as compared to the predicted performance. The control module also compares these calculations to determine whether certain unpredicted events are occurring or Whether the system is operating within predetermined limits. If an unanticipated movement of any of the processes is detected by the time-based control module, that process is halted. The errors are continuously monitored to be within a set tolerance. If an error is outside a predetermined range, it is determined that a malfunction has occurred and appropriate actions are taken. Typically, when a malfunction occurs, the controlled system is shut down. However, if a sensor has malfunctioned, the time-based control system may be operated in a timed mode without the particular faulty sensor. As the ideal and actual performances are tracked, they may become out of sequence. However, as the timed prediction of process time reaches a set interval before conclusion, the time counts are adjusted to equal the sensor. Moreover, any sensor corruption or stoppage can be immediately detected.

Input to and output from the time-based control module is accomplished through an input/output (I/O) module. Output may be stored or displayed. Input may be received from a stored file or may be input by a user via a keyboard, a touch-sensitive screen, or by any other conventional method.

During the operation of the time-based control system, the operation of each process is continuously monitored. As a visual indicator of the monitoring process, a monitor having an input screen is provided. If no movement is anticipated for a particular process but movement is detected, the time-based control system will halt that process. If movement is anticipated but none is detected, movement is detected in the wrong direction, movement is detected to be too fast or too slow, then the particular process is halted or the error is corrected, whichever is most appropriate for the particular situation. If it is determined that a sensor has failed and cannot be readily repaired or replaced, the time-based control system may be used to operate the controlled system in a timed mode, without the use of the failed sensors.

BRIEF DESCRIPTION OF THE DRAWINGS

The above mentioned features of the invention will become more clearly understood from the following detailed description of the invention read together with the drawings in which:

FIGS. 8–13 illustrate in more detail individual portions of the monitor and input screen illustrated in FIG. 7.

BEST MODE FOR CARRYING OUT THE INVENTION

A time-based control system incorporating various features of the present invention is illustrated generally at 10 in the figures. The time-based control system, or control system 10 is designed for controlling each of a plurality of processes in a controlled system. In one embodiment, as illustrated in FIGS. 2–13, the control system 10 is used to control the operation of each of a plurality of motors 12 used in a multiple hoist system for raising and lowering suspended objects 22. Moreover, in the preferred embodiment the control system 10 is designed to monitor the functions, and detect any malfunctions, in each process, such as the illustrated motors 12. Further, the control system of the present invention is designed to detect a failure of any of the sensing elements 26 used to monitor the processes.

Figure 1:
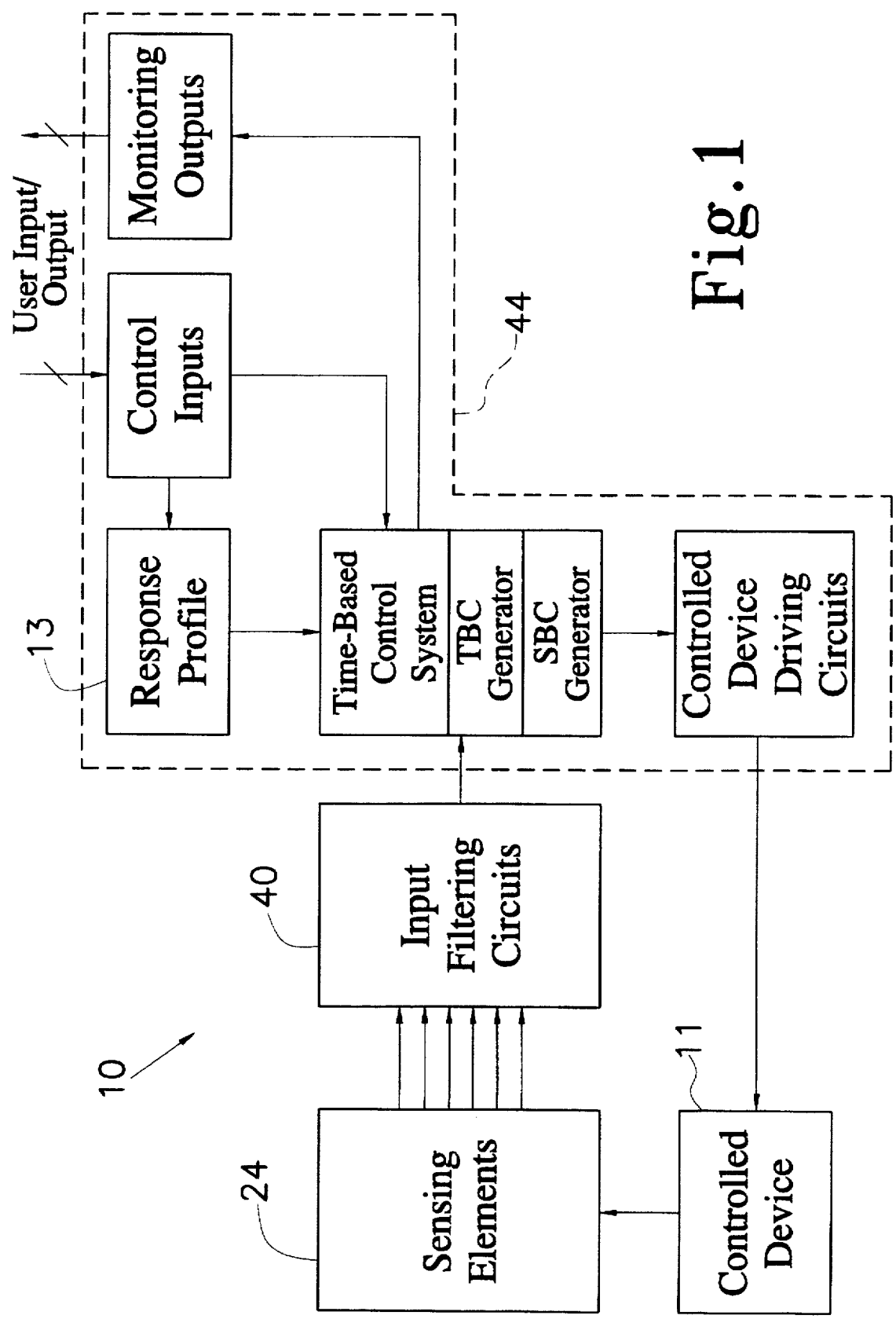
FIG. 1 is a schematic illustration of the time-based control system of the present invention.

As illustrated in FIG. 1, a time-based control module, or control module 44, is used to control the processes of a controlled device 11. At least one sensor 24 is employed for detecting the actual performance of the controlled device 11. Output from the sensors 24 is filtered through at least one input filtering circuit 40 to eliminate extraneous signal noise. The filtered signals are then input to the control module 44 for processing. A response profile 13 is input to the control module 44 for comparison to the actual performance of the controlled device 11. Inputs may be made by a user directly to the control module 44 for real time control, or may be stored in a response profile as illustrated. Outputs from the control module 44 may be delivered to a conventional data storage and retrieval system, to a monitor for real time viewing, or to a printer for hard copy documentation of the performance of the controlled device 11. Based upon the comparison of the actual performance data of the controlled device 11 and the predicted performance based upon the response profile 13, the control module 44 controls the controlled device 11. When the control module 44 detects a malfunction, then, depending upon the source and nature of the malfunction, the control module 40 reacts to either halt the process or begin controlling the controlled device 11 in a time-based manner. Typically, the latter option is employed when a sensor 24 fails or becomes corrupted. In that case, the controlled device 11 is controlled based upon the predicted performance and errors based upon the failed sensor 24 is either overlooked or not determined.

Figure 2:
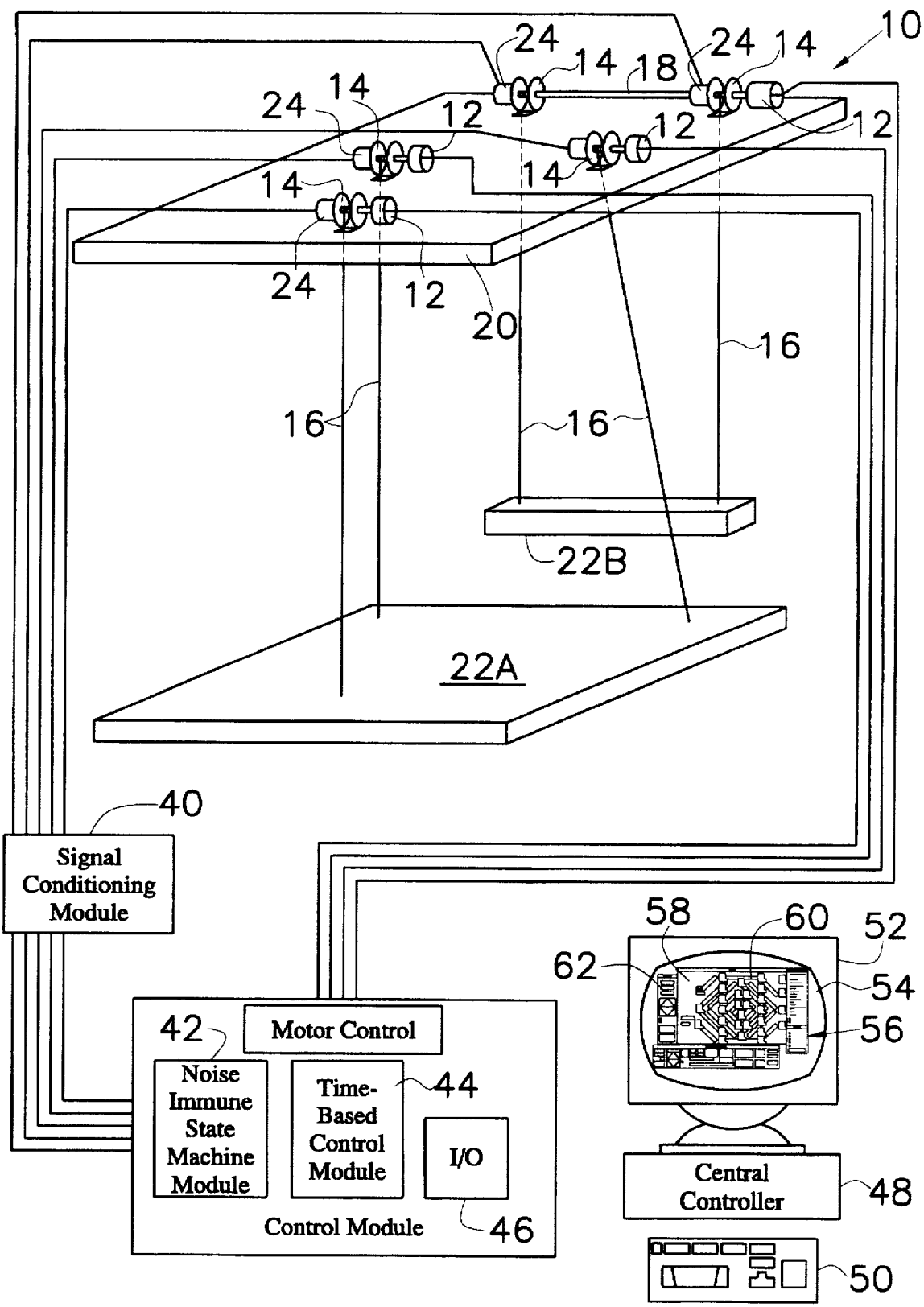
FIG. 2 is a schematic illustration of the time-based control system of the present invention as employed in a computerized motor control system.

FIG. 2 illustrates one embodiment in which the time-based control system 10 of the present invention is used within a motor control system used to control the functions of a plurality of motors 12 for raising and lowering two suspended platforms 22A,B. It will be understood that more or fewer platforms 22 may be controlled, as will be illustrated in FIGS. 7–13. The first platform 22A is suspended from three cables 16 attached at their proximal ends to a take-up reel or spool 14. Each of the spools 14 is secured to an output shaft of a motor 12 such that as the motor 12 is operated, the associated spool 14 is rotated. The direction and speed of rotation of the spool 14 is controlled by the direction and speed of operation of the motor 12. To this extent, each motor 12 of the preferred embodiment is a variable speed, reversible motor.

It will be seen that, for suspended platforms 22 such as the first platform 22A where there are provided three points at which the platform 22A is suspended, the orientation with respect to the horizon may be varied by controlling the operation of each motor 12 independently. For example, operating one motor 12 to retract its associated cable 16 while maintaining the elevational position of each of the other cables 16 will cause the first platform to tilt. Any other combination of raising and lowering the individual cables 16 will create tilt in any number of orientations.

The second platform 22B is suspended by two cables 16 secured at each of the platform ends. A single motor 12 is used to rotate two spools 14, with one each of the two spools 14 being connected to one each of the two cables 16. A connecting rod 18 is interposed between the two spools 14 such that the rotation imparted to each of the spools 14 is substantially equal and in the same direction. In the event that the cables 16 are disposed at substantially the same angle with respect to vertical, as the motor 12 is operated, the second platform 22B will be raised and lowered while substantially maintaining the orientation of the second platform 22B with respect to the horizon.

In each of these two examples, the motors 12 associated with the raising and lowering of the suspended platforms 22 are supported by an existing support structure (not shown) such as a ceiling or roof structure, or by a suspended support structure 20 as shown, which is itself suspended from an existing structure. This latter arrangement is especially beneficial in the example described above for a theatrical performance or concert. In those environments, each of the structures in which the performances are held will be different than the others. Therefore, the only significant adaptation required for the varying structures is the support of the suspended support structure 20. If desired, the individual motors 12 and associated spools 14 may remain secured to the suspended support structure 20 after the stage lighting has been broken down and during transport to the next performance location.

Figure 3:
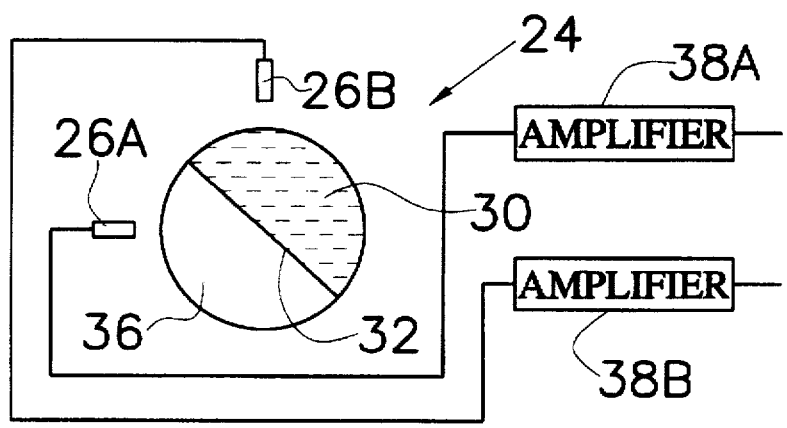
FIG. 3 is a schematic illustration of one embodiment of a sensor module used in the computerized motor control system of FIG. 2 to measure magnitude and direction of movement.

A plurality of sensor modules 24 is used to monitor the rotation of each of the spools 14. In the illustrated embodiment, at least one sensor module 24 is used to monitor the rotation of each spool 14. As best illustrated in FIG. 3, each sensor module 24 consists of two sensing elements 26 separated by some angle. The sensing elements 26 are aimed toward a target 28 which rotates simultaneously with the output shaft of the motor 12. The target 28 defines a rotating surface, a portion of which is distinctive from the other. This distinctive feature is detectible by the sensing elements 26 such that each sensing element 26 can detect which portion of the target 28 is instantaneously being viewed. The distinctive feature may be a reflective surface 30 such that signals emitted from the sensing elements 26 are reflected back.

For example, a sensing element 26 may be described as ON when the reflective portion 30 of the target 28 is passing and OFF when the non-reflective portion 36 of the target 28 is passing. By examining the phase relationship between the two sensing elements 26, the direction, speed, and acceleration of the associated motor 12 is determined. Specifically, the interval between the times at which the sensing elements 26 are ON can be determined, and then, based on the physical specifications of the spool 14 and the relative placement of the sensing elements 26, the speed at which the specific cable 16 is being wound or unwound may be determined. The direction of travel may be determined by the pattern established by the sensing elements 26, which will be described in greater detail below.

The area defining the reflective surface 30 is illustrated as being substantially one-half that of the total area defined by the target 28. Further, the sensing elements 26 are illustrated as being positioned at a substantial right angle with respect to each other, with each being directed at the center of the target 28. However, it will be understood that other proportions of the target 28 area may define a reflective surface 30, and further, that the sensing elements 26 may be disposed at varying angles $\Theta_S$ with respect to each other. However, the preferred arrangement for the sensing elements 26 is at an angle $\Theta_S$ less than the angle $\Theta_R$ defined between a leading edge 32 and a trailing edge 34 of the reflective surface 30.

Specifically, in the illustrated embodiment, this angle $\Theta_R$ is one hundred-eighty (180) degrees. However, if this angle $\Theta_R$ is ninety (90) degrees, then the angle $\Theta_S$ defined between the sensing elements 26 is less than ninety (90) degrees. By having such an arrangement, both sensing elements 26 will not be allowed to change from either ON to OFF or OFF to ON simultaneously, nor will either of the sensing elements 26 be allowed to change twice (OFF to ON to OFF) before the other sensing element 26 changes once (OFF to ON). Further, the angle $\Theta_N$ defined between the reflective surface leading and trailing edges 32,34 as measured over the nonreflective portion 36 of the target 28 area is greater than the angle $\Theta_S$ defined between the sensing elements 26. Thus, one sensing element 26 will not be allowed to change from ON to OFF to ON before the other of the sensing elements 26 changes from ON to OFF. This provides the ability to establish a pattern such that the direction and speed of the motor 12 may be determined. For example, in the illustrated embodiment, when the target 28 is rotating in a clockwise direction from the illustrated position, the second sensing element 26B will be the first to change, and that change will be from ON to OFF. The next expected change will be the first sensing element 26A from OFF to ON, then the second sensing element 26B from OFF to ON, then the first sensing element 26A from ON to OFF. This completes approximately one rotation of the target 28. It will be seen that, if the first such rotation is not complete, any deficiency is less than the angular spacing of the sensing elements 26A,B and, after each successive complete rotation of the target 28, the initial deficiency becomes more negligible in detecting the total movement of the motor 12. If a pattern opposite this is detected, then the target 28 is rotating in the counterclockwise direction. If any other pattern is detected, then it will be recognized that the motor 12 is moving in an inappropriate manner and the motor 12 can be powered off. This detection may also indicate a sensing element 26 failure and thus power off the sensing element 26 in similar fashion.

In the preferred embodiment, the sensor module 24 incorporates a self-contained power supply with a high current amplifier and is capable of optical full quadrature sensing. The sensing element 26 of the preferred embodiment is capable of transmitting speed and direction information through high noise environments over a relatively long cable. The sensor module 24 of the preferred embodiment requires no calibration and cable length is no factor. Although a particular sensor module 24 has herein been described, it will be understood that such disclosure is not intended to limit the present invention to such sensor module 24. Moreover, it will be understood that any conventional sensing element may be incorporated into the present invention, depending upon the purpose for which the present invention is used, so long as the sensing element is capable of sensing the appropriate rate of change of the particular property (i.e., weight, temperature, distance) and the direction of that change.

Figure 4:
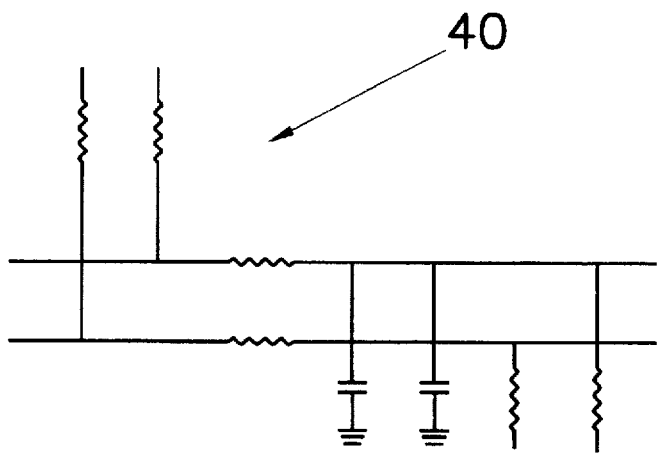
FIG. 4 is a schematic illustration of one embodiment of a signal conditioning module used in the computerized motor control system of FIG. 2.
Figure 5:
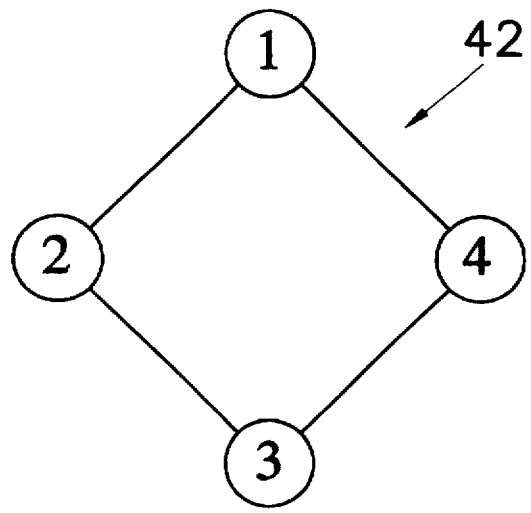
FIG. 5 is a graphical representation of the functions of the noise immune state machine module used in the computerized motor control system of FIG. 2.

Each sensing element signal is then routed through an amplifier 38 to a signal conditioning module 40. The signal conditioning module 40 conditions the signal from the sensor module 24 to eliminate bouncing, latching and transmission line reflections. The signal conditioning module 40 also limits the signal from the sensor module 24 in order to maintain the signal within a specified tolerance. As illustrated in FIG. 4, the signal conditioning module 40 may comprise a conventional low-pass filter.

The signal conditioning module 40 outputs to a noise immune state machine module 42, which provides redundancy by checking the values output by the signal conditioning module 40. Specifically, the state machine module 42 monitors the state transmissions of both of the output signals from the signal conditioning module 40 for each sensor module 24. When the data is correct, it must arrive in a sequence according to that briefly described above to indicate the ON and OFF states of each of the sensing elements 26. The state machine module 42 detects noise in the input signal by identifying illegal transitions between the given set of states.

Due to the nature of the sensor module 24, the signals will be out of phase by some angle $\Theta_S$ such as the illustrated 90 degrees. There are four possible states: (1) ON-ON; (2) ON-OFF; (3) OFF-OFF; and (4) OFF-ON. The first ON or OFF is indicative of the status of the first sensing element 26A, and likewise for the second sensing element 26B. If the spool 14 is rotating one way, the sequence for each sensing element must be 1-2-3-4, while if the spool 14 is rotating in an opposite direction, the sequence must be 4-3-2-1. Thus by examining the sequence of states, the direction of rotation of the spool 14 is deduced. The state machine module 42 detects any illegal state transitions. Illegal transitions include transitions from state 1 to state 3 (1–3), from state 3 to state 1 (3–1), from state 2 to state 4 (2–4), or from state 4 to state 2 (4–2).

Counts are generated and either added to or subtracted from a count total by the state machine module 42 when a legal state transition is detected. For example, a state transition from 1 to 2 adds a count and the state transition from 2 to 1 subtracts a count. In the preferred embodiment, the recognition of an illegal state transition does not affect the count total, thus making the state machine module noise-immune.

The count total is then output to a time-based control module, or control module 44. Input to the control module 44 includes the count total generated by the state machine module 42 and several parameters stored within the central controller 48 or input via the monitor and input screen 86. The control module 44 provides error detection and failure mode analysis. The control module 44 allows the central controller 48 to predict where each motor 12 should be and then compares the predicted value to the actual value generated by the state machine module 42.

Figure 6:
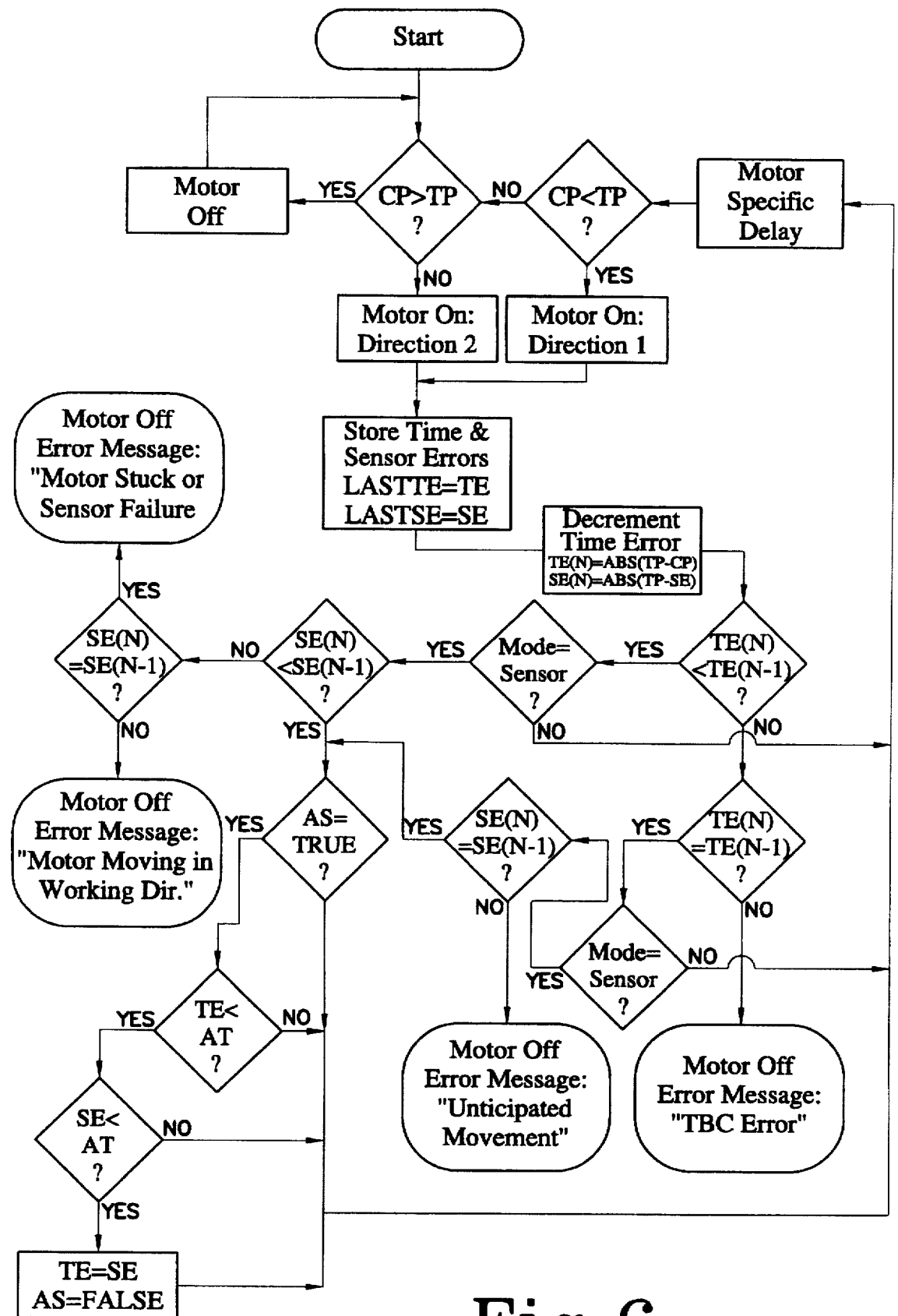
FIG. 6 is a flow chart of the functions of one embodiment of the time-based control module used in the computerized motor control system of FIG. 2.

FIG. 6 illustrates a flow chart of the operations of the control module 42. Initially, the control module 42 calculates a time error TE which is defined as the absolute value of the difference in the target position TP (predicted by the central controller 48 based on the target profile 13 and the current position CP (calculated by the state machine module 42). If the time error TE is zero, then the motor 12 is where it was predicted to be and the motor 12 is powered OFF. If the time error TE is something other than zero, then the motor 12 is powered ON. Each time a motor 12 is examined, new sensor error SE and time error TE values are calculated and compared with the last read values. The time error TE is decremented, as well as a sensor error SE, which is defined as the absolute value of the difference between the target position TP and the previous sensor error SE.

When comparing the time and sensor errors TE,SE to the previous time and sensor errors TE,SE, both of the time and sensor errors TE,SE should either be constant or decreasing. If the time error TE is decreasing, then the sensor error SE should be decreasing. If the time error TE is steady, then sensor error SE should be steady as well. If any other situation is detected, the motor 12 is powered OFF and an appropriate error message is displayed. If the time error TE is decreasing and the sensor error SE is increasing, the motor 12 is deduced as moving in the wrong direction. If the time error TE is decreasing and the sensor error SE is steady, then either the motor 12 is stuck or there is a sensor 24 failure such as a broken sensor lead. If the time error TE is steady and the sensor error SE is either increasing or decreasing then the motor 12 is deduced as having unanticipated movement.

In the present invention, a maximum allowable difference between the time error TE and sensor error SE may be defined to allow for the detection of a motor 12 running too fast or too slow and for the correction of such occurrences. Further, an adjustment threshold AT and a flag AS are defined to compensate for small differences between the time error TE and the sensor error SE. The flag AS is initially set as TRUE. As the motor 12 approaches the target position TP, the control module 44 monitors the time error TE. When both the time error TE and sensor error SE are less than the adjustment threshold AT, the control module 44 sets the time error TE and the sensor error SE equal to each other and sets the flag AS to FALSE. The movement of the motor 12 is thus accurately completed because the time and sensor errors TE,SE can be perfectly synchronized over small distances. The control problem of resolving forces as a control system 10 approaches its final destination is thus resolved and complete accuracy is preserved without being affected by weight or other environmental factors. After the time error TE and the sensor SE have been compared to the adjustment threshold AT or the flag AS has been determined as FALSE, the response profile 13 is referenced at the MOTOR SPECIFIC DELAY block illustrated in FIG. 6.

After the time and sensor errors TE,SE have been compared, whether they have been equated or not, the target and current positions TP,CP are again compared. If the target and current positions TP,CP are the same, then the motor 12 is powered OFF. However, if they are not, the above process is repeated.

The input/output (I/O) module 46 is provided for transmitting data to and reading data from the control module 44 using a conventional protocol—i.e., serial or parallel transmission. The I/O module 46 must send a valid command to the control module 44 within every predetermined time interval to ensure that higher level systems are functioning properly. If a valid signal is not received by the control module 44, the control module 44 detects that a failure has occurred and responds accordingly. The data read from the control module 44 is used to generate a portion of the monitor and input screen 56 displayed on the operator display 54. Preferably, the data read from the control module 44 is represented graphically for ease of interpretation. The data written to the control module 44 is stored as cues, with each cue being a series of target positions TP to be achieved by each motor 12. Writing a set of target positions TP to the control module 44 allows preprogrammed positions to be written at the discretion of the operator, thus effecting various sets of positions which can be recalled and played back. Providing a method of automatically calling cues allows the system 10 to run various cues in sequence, thus allowing the motors 12 to be controlled in a substantially automated fashion.

Control of the control module 44 is performed via the central controller 48. Typically, the central controller 48 is a computer provided with conventional data input mechanisms including a keyboard 50. Input parameters include, but are not limited to, the target position TP (input by user), current position CP (calculated by the state machine module), adjustment threshold AT (input by user), and the flag AS (input by user). After these values have been received from their respective sources by the control module 44, the control module 44 is enabled to perform substantially complete control of each of the motors 12 associated with the control system 10.

Any conventional method may be used for user input. As illustrated, a central controller 48 is used in the preferred embodiment of the present invention. This type of controller may be used to control several control modules 44 simultaneously. Therefore, it will be understood that the present invention is not limited to the control of one network of motors 12 by the central controller 48.

Figure 7:
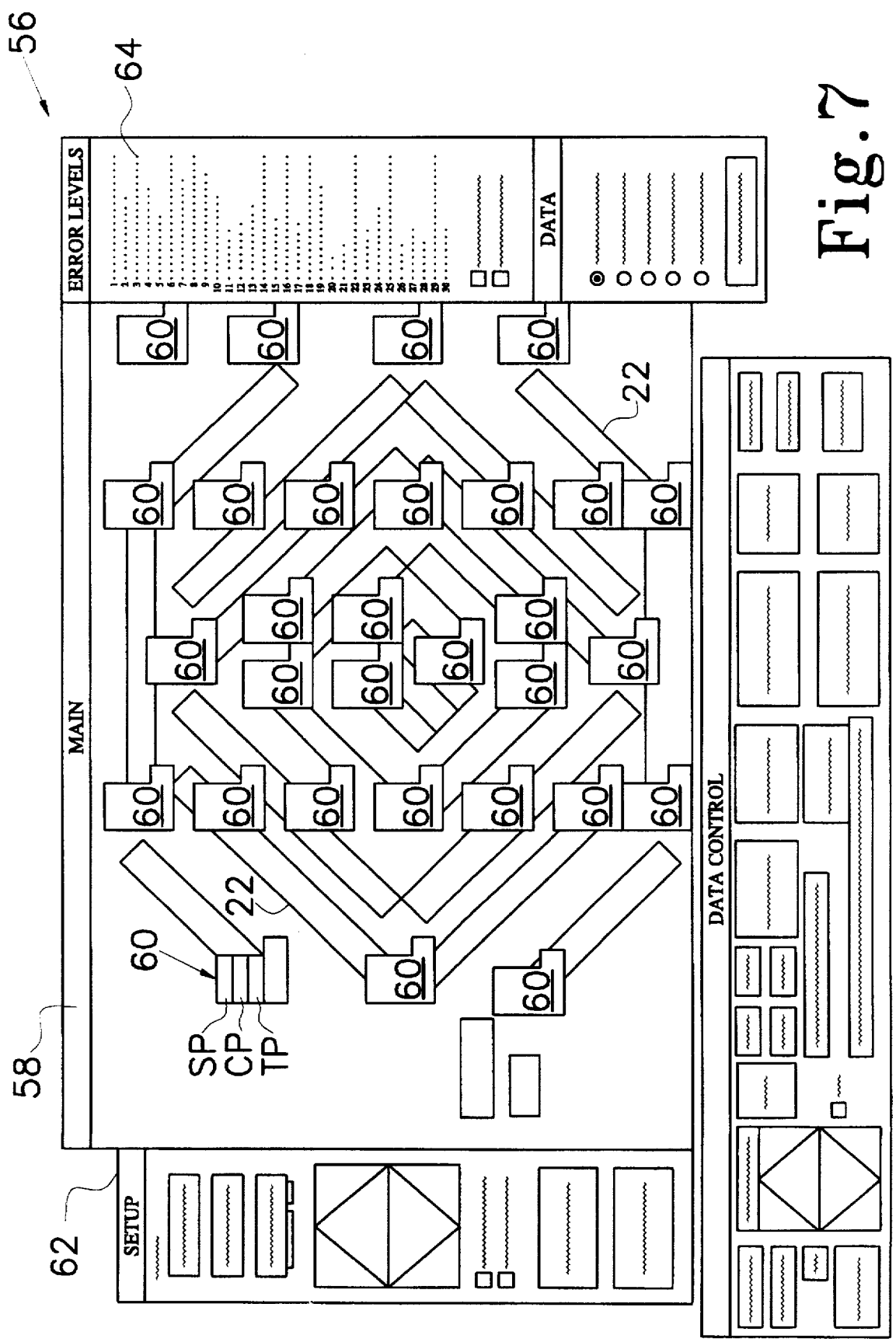
FIG. 7 is an illustration of one arrangement of a monitor and input screen used in the operation of the computerized motor control system of FIG. 2.

Incorporated in the central controller 48 of the present invention is a monitor 52 including a touch-sensitive screen 54. As is inherent with a touch-sensitive screen 54, the touch of a selected portion of the screen 54 will activate a particular command. Therefore, the touch of the screen 54 serves as input to the central controller 48. Illustrated in FIG. 7 is an example of a monitor and input display 56 from a touch-sensitive screen 54 showing an arrangement of trusses 22 used to support lights for a concert. Several discrete regions are defined on the monitor and input display 56. The central or main portion 58 of the screen 56 is a display illustrating graphically the arrangement of suspended objects 22. Also illustrated is a plurality of status boxes 60, one each for each of the motors 12 used in the particular system. Each status box 60 is strategically placed to indicate the approximate position of each motor 12 in relation to the suspended objects 22.

In the illustrated embodiment, thirty motors 12 are used. For ease of viewing, motors 12 that are used to hoist the same suspended object 22 are color coded. For example, two motors 12 are used to hoist one truss 22. The status box 60 for each of these motors 12 may be displayed with a green background. Thus when it is desirable to raise both motors 12, the green status boxes 60 may be chosen and the values displayed therein modified. As shown, those values may include the sensor position SP, the current position CP, the target position TP, and information relating to the grouping of the motor 12. Other information may be displayed here as well.

The setup region 62, further illustrated in FIG. 8, is provided for initial input by a user. A SELECT ALL button is provided for selecting all motors 12 to operate. A CLEAR ALL button is provided for deselecting all of the motors. A region denoted as LIMITS - GROUPS is provided to open a further window illustrated in FIG. 9. UP and DOWN arrows are provided for incrementing and decrementing the position of all of the selected motors 12. A GROUP SELECT MODE option is provided such that when active, the selection of one motor 12 in effect selects all motors 12 within its predefined group. A MANUAL PROGRAM option allows a user to deactivate the control module 44 insofar as its looks for unexpected motor movement such that the user may manually operate the motors 12. A SAVE MANUAL button reveals the SAVE MANUAL PRESET illustrated in FIG. 13. Finally, a SENSOR MODE button serves as a toggle switch to choose between a sensor and time or a time only mode for visually monitoring each of the selected motors 12.

The EDIT GROUPS AND LIMITS window illustrated in FIG. 9 is provided for placing each of the plurality of motors 12 in particular groupings and to set high and low limits for each motor 12. Currently displayed are motors 1–9, each belonging to group #0. Any of the displayed specifications are changed by touching the particular item and then entering the updated information through the keyboard 50 or by pressing up/down arrows (not shown). The SAVE button provides a means for saving all of the current values in the Limits/Groups table to a file. Touching the AUTO button causes the central controller to calculate high and low limits for all of the motors 12 using the maximum and minimum values of all received input—i.e., cues—for each motor. The EDIT GROUPS AND LIMITS window may be closed by either touching the CLOSE button or by touching the "–" button and then the "CLOSE" option.

FIG. 10 is a bar graph representation of the current position of each of the motors 12. This region provides a means for quickly and simultaneously viewing the activity of each of the motors 12. Each bar 64 represents one hundred percent (100%) of the desired movement of each of the motors 12. As the motor 12 moves, the bar graph representative of that motor 12 will move to the right. When the motor 12 has reached the desired position, the bar graph will simultaneously reach the right-hand limit of the graph. As illustrated, there are two bars 64A,B displayed for each of the motors 12. The first bar 64A illustrates the displacement of the motor 12 as determined from the values recorded by the sensor 24. The second bar 64B illustrates the displacement of the motor 12 as determined by predicted values. Thus, the two bars 64A,B will move toward the right-hand side of the graph at approximately the same rate.

Figure 11:
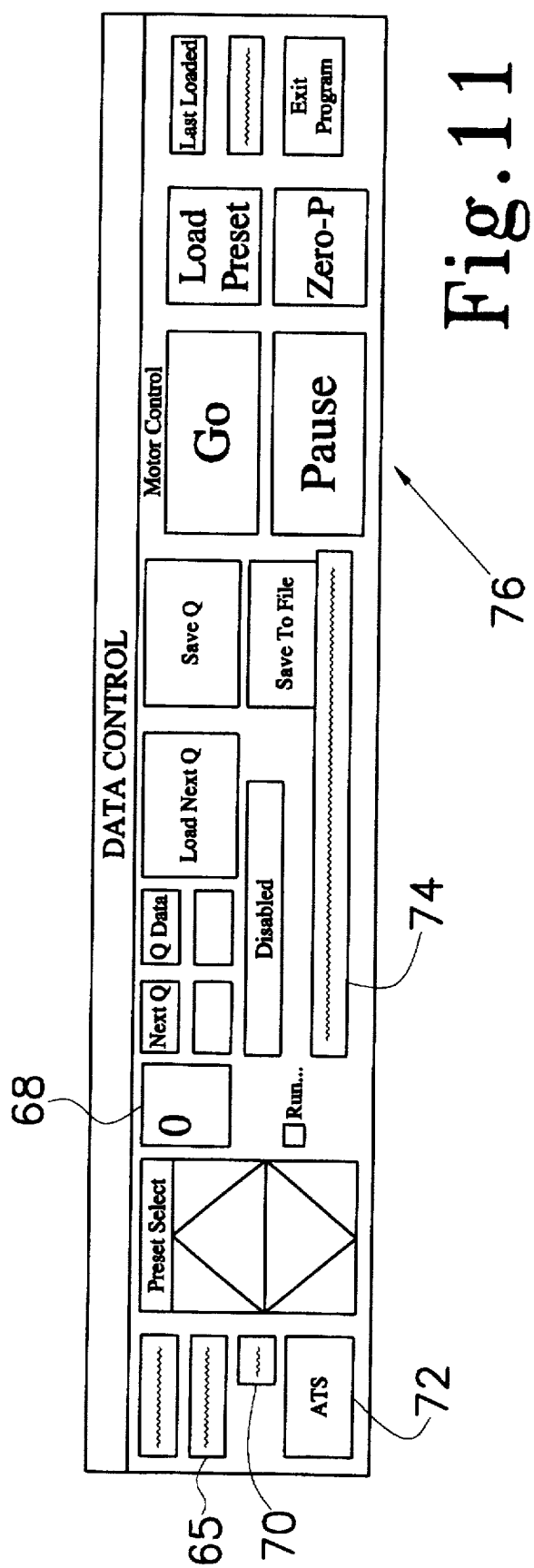

FIG. 11 illustrates a DATA CONTROL window. The I/O status window displays the result of the last executed host command. If an error has occurred, the display will reveal such. The current command window 66 displays the current command being executed and the demux address to which the command is sent. UP/DOWN arrows are provided for selecting a preset. The current preset window 68 displays the current preset as select through the UP/DOWN arrows. Currently, the preset "0" has been chosen. The adjustment threshold AT is displayed at 70. A manual adjustment threshold button 72 is provided for manually setting the timer error TE equal to the sensor error SE. Typically, this feature is available when the adjustment threshold AT has been deactivated. A RUN switch is provided for automatically sequencing a series of ques such that as one que is completed, the next que begins. A STATUS bar is provided to indicate the status of the run mode. Currently, the run mode is disabled. The next que to be run is displayed in the NEXT Q window. The time remaining (typically in seconds) until the next que is run is displayed in the Q DATA window. The LOAD NEXT Q button is provided for manually loading the next que when the run mode is disabled. If the current que has been edited and it is desirable to save the changes made, the SAVE Q button is touched. If it is desired to save all of the ques to the current que file, the SAVE TO FILE button is touched. The filename of a saved que is selectable on powerup such that, theoretically, an infinite number of que files may be associated with any control system 10. An input display window 74 is provided for displaying a text description for each que as input by the user.

A motor control region 76 is provided within the DATA CONTROL window. The GO button is provided for determining new target positions for a preset que. The GO button also resumes a que that has been paused. The PAUSE button immediately stops the movement of all motors 12. The LOAD PRESET button is provided for preparing the central controller 48 to write the currently displayed target positions TP. The ZERO—P button is provided calibrating the system to any preset. The LAST LOADED window displays the number of the last loaded preset. Finally, the EXIT button is provided for exiting the program used to control the operation of each of the motors 12.

Figure 12:
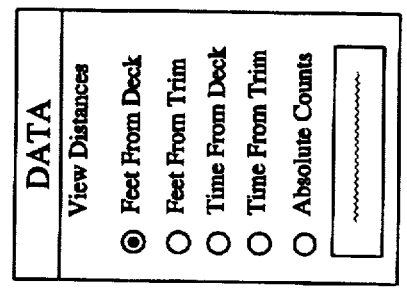

The DATA region illustrated in FIG. 12 is provided for selecting the units of movement (distance or time) and reference point for movement. These selections are apparent in the status boxes illustrated in the MAIN region 58 of the screen 56.

Figure 13:
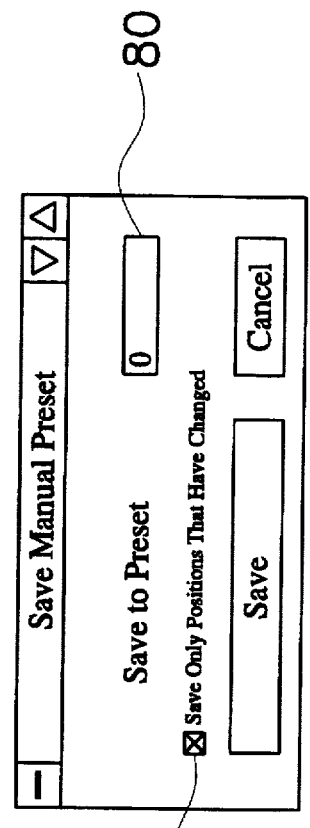

FIG. 13 depicts a SAVE MANUAL PRESET window. The number of the preset to which changes are to be saved is indicated in the window illustrated at 80. The user may opt to save only those positions that have changed at the box indicated by 78. The SAVE and CANCEL buttons are used to either save the changes that have been made or to cancel the changes.

During the operation of the control system 10, the movement of each motor 12 is being constantly monitored. As a visual indicator of the monitoring process, the monitor and input screen 56 is provided. As described in detail above, the movement of each motor 12 is monitored with respect to anticipated movement, or that movement input by the user and stored in ques which may be run in a predetermined sequence. If no movement is anticipated for a particular motor 12 but movement is detected, the control system 10 will power that motor 12 OFF. If movement is anticipated but none is detected, movement is detected in the wrong direction, movement is detected to be too fast or too slow, then the particular motor 12 is powered OFF or the error is corrected, whichever is most appropriate for the particular situation.

From the foregoing description, it will be recognized by those skilled in the art that a computerized motor control system offering advantages over the prior art has been provided. Specifically, the control system monitors a plurality of motors used to hoist suspended objects. Sensors are provided for detecting movement, including speed and direction, of individual motors. A central controller is provided for determining target positions and accompanying times and comparing those with the sensor output. Thus, speed, direction, and position errors are determined such that any errors may be corrected or motors powered OFF.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,
We claim:

1. A time-based control system for controlling at least one process in a controlled system, said time-based control system comprising:

at least one sensor for detecting actual performance of each process in the controlled system, each said sensor continuously detecting a magnitude and direction of change of a quantity associated with the process for which said sensor is employed;

a state device for receiving output signals from said sensor to determine the magnitude and direction of change of the quantity during each process and further to detect illegal state transitions, said illegal state transitions indicating a malfunction of said sensor;

control circuitry for determining a current magnitude of the quantity during the process using output from said state device, said control circuitry comparing said current magnitude with a predetermined target magnitude to determine a current time error, said control circuitry comparing said predetermined target magnitude with a sensor error to determine a current sensor error, said sensor error having an initial value equal to said current time error, said control circuitry controlling each process based on said current time error and said current sensor error, said control circuitry being provided for monitoring an integrity of each process and each said at least one sensor based on a comparison of said current time error with an immediately previous time error and a comparison of said current sensor error with an immediately previous sensor error, said control circuit halting a process upon detection of a failure of a component associated with the process, said control circuitry further serving to halt a process associated with one of said at least one sensor upon detection of a failure of said sensor;

an output device for outputting data from said control circuitry; and an input device for inputting data to be used by said control circuitry to determine said target magnitude.

2. The time-based control system of claim 1 wherein each said sensor is provided for detecting magnitude and direction of movement of a controlled object, said time-based control system being provided for positioning the controlled object.

3. The time-based control system of claim 1 wherein each said sensor is provided for detecting magnitude and direction of change of temperature of a controlled environment, said time-based control system being provided for maintaining the controlled environment within a selected temperature range.

4. The time-based control system of claim 1 wherein each said sensor is provided for detecting magnitude and direction of change of weight of a controlled volume, said time-based control system being provided for maintaining the controlled volume within a selected weight range.

5. The time-based control system of claim 1 further comprising a central controller for receiving, processing, and storing said data input at said input device and said output from said output device.

6. The time-based control system of claim 1 further comprising a monitor having a display screen for displaying said data output from said control circuitry.

7. The time-based control system of claim 6 wherein said input device includes at least said display screen of said monitor, said display screen being touch-sensitive.

8. The time-based control system of claim 1 further comprising signal conditioning circuitry for receiving and filtering said output signals from said at least one sensor.

9. A time-based control system for controlling at least one process in a controlled system, said time-based control system comprising:

at least one sensor for detecting actual performance of each process in the controlled system, each said sensor continuously detecting a magnitude and direction of change of a quantity associated with the process for which said sensor is employed;

signal conditioning circuitry for receiving and filtering said output signals from said at least one sensor;

a state device for receiving output signals from said sensor to determine the magnitude and direction of change of the quantity during each process and further to detect illegal state transitions, said illegal state transitions indicating a malfunction of said sensor;

control circuitry for determining a current magnitude of the quantity during the process using output from said state device, said control circuitry comparing said current magnitude with a predetermined target magnitude to determine a current time error, said control circuitry comparing said predetermined target magnitude with a sensor error to determine a current sensor error, said sensor error having an initial value equal to said current time error, said control circuitry controlling each process based on said current time error and said current sensor error, said control circuitry being provided for monitoring an integrity of each process and each said at least one sensor based on a comparison of said current time error with an immediately previous time error and a comparison of said current sensor error with an immediately previous sensor error, said control circuit halting a process upon detection of a failure of a component associated with the process, said control circuitry further serving to halt a process associated with one of said at least one sensor upon detection of a failure of said sensor;

an output device for outputting data from said control circuitry;

an input device for inputting data to be used by said control circuitry to determine said target magnitude.

a central controller for receiving, processing, and storing said data input at said input device and said output from said output device; and a monitor having a display screen for displaying said data output from said control circuitry, said input device including at least said display screen of said monitor, said display screen being touch-sensitive.

10. The time-based control system of claim 9 wherein each said sensor is provided for detecting magnitude and direction of movement of a controlled object, said time-based control system being provided for positioning the controlled object.

11. The time-based control system of claim 9 wherein each said sensor is provided for detecting magnitude and direction of change of temperature of a controlled environment, said time-based control system being provided for maintaining the controlled environment within a selected temperature range.

12. The time-based control system of claim 9 wherein each said sensor is provided for detecting magnitude and direction of change of weight of a controlled volume, said time-based control system being provided for maintaining the controlled volume within a selected weight range.

* * * * *